(12) United States Patent
Song et al.

(10) Patent No.: US 11,650,143 B2
(45) Date of Patent: May 16, 2023

(54) METHOD FOR COMPILING EQUIVALENT ACCELERATION SPECTRUM OF CREEP UNDER VARIABLE TEMPERATURES AND LOADS

(71) Applicant: NANJING UNIVERSITY OF AERONAUTICS AND ASTRONAUTICS, Nanjing (CN)

(72) Inventors: Yingdong Song, Nanjing (CN); Xu Zhao, Nanjing (CN); Zhigang Sun, Nanjing (CN); Xuming Niu, Nanjing (CN); Yaning Chang, Nanjing (CN); Qiuhong Peng, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/733,853

(22) Filed: Apr. 29, 2022

(65) Prior Publication Data
US 2022/0260468 A1 Aug. 18, 2022

Related U.S. Application Data

(63) Continuation of application No. PCT/CN2021/129576, filed on Nov. 9, 2021.

(30) Foreign Application Priority Data

Dec. 24, 2020 (CN) .......................... 202011556547.1

(51) Int. Cl.
*G01N 3/18* (2006.01)
*G01N 3/36* (2006.01)

(52) U.S. Cl.
CPC ................ *G01N 3/18* (2013.01); *G01N 3/36* (2013.01); *G01N 2203/0017* (2013.01);
(Continued)

(58) Field of Classification Search
CPC .... G01N 3/18; G01N 3/36; G01N 2203/0017; G01N 2203/0048; G01N 2203/0071;
(Continued)

(56) References Cited

U.S. PATENT DOCUMENTS 5,042,295 A * 8/1991 Seeley ..................... G07C 3/00
701/100
2015/0377757 A1 12/2015 Ali
2019/0018403 A1 1/2019 Ueki

FOREIGN PATENT DOCUMENTS

CN       106096210 A    11/2016
CN       107247002 A    10/2017
(Continued)

OTHER PUBLICATIONS

First Office Action issued in counterpart Chinese Patent Application No. 202011556547.1, dated Aug. 20, 2021.
Second Office Action issued in counterpart Chinese Patent Application No. 202011556547.1, dated Mar. 9, 2022.
Wang et al., Chinese Mechanical Design Code (vol. 2): Fundamentals of Mechanical Design, pp. 1093-1095, Jiangxi Science & Technology Press, China, dated Jan. 31, 2002.
(Continued)

*Primary Examiner* — Jonathan M Dunlap
(74) *Attorney, Agent, or Firm* — Westbridge IP LLC

(57) ABSTRACT

Disclosed is a method for compiling an equivalent acceleration spectrum of creep under variable temperatures and loads. The method includes following steps: respectively carrying out a material high-temperature tensile test, material high-temperature creep tests and creep tests under two-stage variable temperatures and loads, and calculating values of a parameter p in a creep damage accumulation model under two-stage variable temperatures and loads; based on a nonlinear damage accumulation model under multi-stage variable temperatures and loads, calculating a damage D caused by a multi-stage variable temperatures and loads creep load spectrum by utilizing values of parameter p; based on the principle of consistency of damage D, transforming the multi-stage variable temperatures and loads creep load spectrum into an equivalent acceleration
(Continued)

spectrum of a first-order maximum creep load, and finally compiling the equivalent acceleration spectrum of creep under variable temperatures and loads.

6 Claims, 4 Drawing Sheets

(52) U.S. Cl.
CPC ............... *G01N 2203/0048* (2013.01); *G01N 2203/0071* (2013.01); *G01N 2203/0073* (2013.01); *G01N 2203/0226* (2013.01); *G01N 2203/0676* (2013.01)

(58) Field of Classification Search
CPC ... G01N 2203/0676; G01N 2203/0073; G01N 2203/0226
See application file for complete search history.

(56) References Cited

FOREIGN PATENT DOCUMENTS

| | | |
|---|---|---|
| CN | 109142083 A | 1/2019 |
| CN | 109918788 A | 6/2019 |
| CN | 110705019 A | 1/2020 |
| CN | 111291477 A | 6/2020 |
| CN | 112730117 A | 4/2021 |
| JP | H07151662 A | 6/1995 |
| KR | 20010103352 A | 11/2001 |

OTHER PUBLICATIONS

Zhu, Creep Behavior and Life Prediction of High Chromium Heat Resistant Steel at Elevated Temperature, Doctor Dissertation submitted to Northwest University, China, dated Apr. 15, 2020.

* cited by examiner

METHOD FOR COMPILING EQUIVALENT ACCELERATION SPECTRUM OF CREEP UNDER VARIABLE TEMPERATURES AND LOADS

CROSS-REFERENCE TO RELATED APPLICATIONS

The present application is a continuation of International Application No. PCT/CN2021/129576, filed on Nov. 19, 2021, which claims priority to Chinese Patent Application No. 202011556547.1, filed on Dec. 24, 2020. The contents of the above-mentioned applications are incorporated herein by reference in their entireties.

TECHNICAL FIELD

The present application relates to the technical field of structures strength and integrity at high temperatures, in particular to a method for compiling an equivalent acceleration spectrum of creep under variable temperatures and loads.

BACKGROUND

As aviation technology is developed, a service life of an aero-engine is prolonged continuously. At present, the service life of a military engine has reached 6000 hours, and that of a civil aero-engine is as long as tens of thousands of hours. The conventional life-cycle testing method has been far from meeting the test demand. It takes months or even years to conduct a life-cycle test, which has some disadvantages, such as high costs and long cycles. Therefore, it is necessary to compile an acceleration spectrum based on the whole life test spectrum.

Key parts of the aero-engine such as turbine blade, disk, nozzle ring, etc., are often influenced by a creep load under variable temperatures and loads, and eventually are exposed to creep damage, leading to fracture. Therefore, when the acceleration spectrum is compiled, a long-term creep load under variable temperatures and loads must be equivalently converted to a large creep load state, so as to shorten run time for a test. However, existing equivalent conversion methods of creep loads generally have problems, such as low accuracy, complication and insufficient scientific basis.

SUMMARY

An objective of the application is to provide a method for compiling an equivalent acceleration spectrum of creep under variable temperatures and loads, so as to compile the equivalent acceleration spectrum of creep under variable temperatures and loads more simply and accurately.

To achieve the above objective, the present application adopts the following technical scheme:

the application relates to a method for compiling the equivalent acceleration spectrum of creep under variable temperatures and loads, and the method includes following steps:

S1: obtaining a corresponding tensile strength $\sigma_{bi}$ at different temperatures $T_i$ through a high-temperature tensile test of materials, where i=1, 2, 3 ..., n;

S2: obtaining a corresponding creep fracture time $t_{fi}$ under different stress-temperature ($\sigma_i, T_i$) combinations through high-temperature creep tests of materials;

S3: obtaining a creep duration $t_i$ corresponding to each stage of load through creep tests under two-stage variable temperatures and loads;

S4: calculating values of parameter p in the creep damage accumulation model by combining the tensile strength $\sigma_{b1}$ and the tensile strength $\sigma_{b2}$ obtained in S1, the creep fracture time $t_{f1}$ and the creep fracture time $t_{f2}$ obtained in S2 and the creep duration $t_1$ and the creep duration $t_2$ obtained in S3 based on a creep damage accumulation model under two-stage variable temperatures and loads; and S5: calculating a damage D caused by a creep load spectrum under multi-stage variable temperatures and loads by utilizing the values of parameter p obtained in S4 according to a nonlinear damage accumulation model of creep load under multi-stage variable temperatures and loads; converting the creep load spectrum under multi-stage variable temperatures and loads into an equivalent acceleration spectrum of a single-stage maximum creep load based on the principle of consistency of damage D, and finally compiling the equivalent acceleration spectrum of creep under variable temperatures and loads.

In S1, the high-temperature tensile test of materials is carried out on an electro-hydraulic servo fatigue tester.

In S2, the high-temperature creep tests of materials are carried out on a creep tester, and a series of high-temperature creep tests of materials under different stress-temperature ($\sigma_i, T_i$) combinations are carried out.

In S3, according to results of high-temperature creep tests, the creep tests under two-stage variable temperatures and loads are carried out on the creep tester until fracture occurs, and the creep duration $t_i$ corresponding to each stage of load is recorded.

In S4, the creep damage accumulation model under two-stage variable temperatures and loads is $$\left(\frac{t_1}{t_{f1}}\right)^{\varphi_{1,2}} + \frac{t_2}{t_{f2}} = 1,$$

where $$\varphi_{1,2} = \ln\left(\frac{-\ln(\sigma_2/\sigma_{b2})}{-p}\right) \Big/ \ln\left(\frac{-\ln(\sigma_1/\sigma_{b1})}{-p}\right)$$

In S4, p is an average value of several groups of tests.

In S5, the nonlinear creep damage accumulation model load under multi-stage variable temperatures and loads is $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}},$$

where $$\varphi_{n-1,n} = \ln\left(\frac{-\ln(\sigma_n/\sigma_{bn})}{-p}\right) \Big/ \ln\left(\frac{-\ln(\sigma_{n-1}/\sigma_{bn-1})}{-p}\right).$$

In S5, assuming a state with maximum creep loads in the creep load spectrum under multi-stage variable temperatures and loads to be ($\sigma_2, T_2$), then according to the principle of damage D equivalence, $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}} = \frac{t_{equal}}{t_{f2}},$$

other states with smaller creep loads are equivalently accelerated to the state ($\sigma_2$, $T_2$) with maximum creep loads, and a duration of original creep load spectrum under multi-stage variable temperatures and loads can be accelerated to $t_{equal}$ of equivalent acceleration spectrum of creep from $t_1+t_2+\ldots+t_n$, so as to compile the equivalent acceleration spectrum of creep under variable temperatures and loads.

Compared with the prior art, the technical scheme has the following advantages:

1. The method for compiling the equivalent acceleration spectrum of creep under variable temperatures and variable loads proposed by the application only needs to carry out high-temperature tensile tests, high-temperature creep tests and a certain number of creep tests under variable temperatures and variable loads to obtain the tensile strength $\sigma_{bi}$ at the corresponding temperature, the creep fracture time $t_{fi}$ at the corresponding stress and temperature and the creep duration $t_i$ of all-stage loads, with few required parameters, simple tests and low costs.

2. The method for compiling the equivalent acceleration spectrum of creep under variable temperatures and loads proposed by the application adopts the nonlinear creep damage accumulation model and compiles the equivalent acceleration spectrum of creep based on the principle of damage equivalence.

3. The method for compiling the equivalent acceleration spectrum of creep under variable temperatures and loads proposed by the application could be applied to common materials such as metals and alloys in engineering, with extended applicability and strong popularization.

DETAILED DESCRIPTION OF THE EMBODIMENTS

The present application will be further explained with reference to accompanying drawings.

Figure 1:
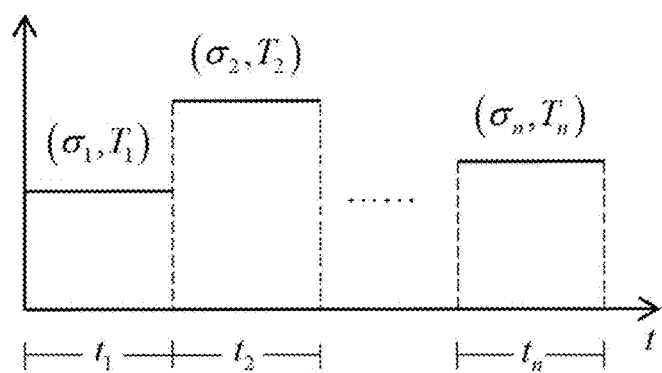
FIG. 1 is a creep load spectrum under multi-stage variable temperatures and loads.
Figure 2:
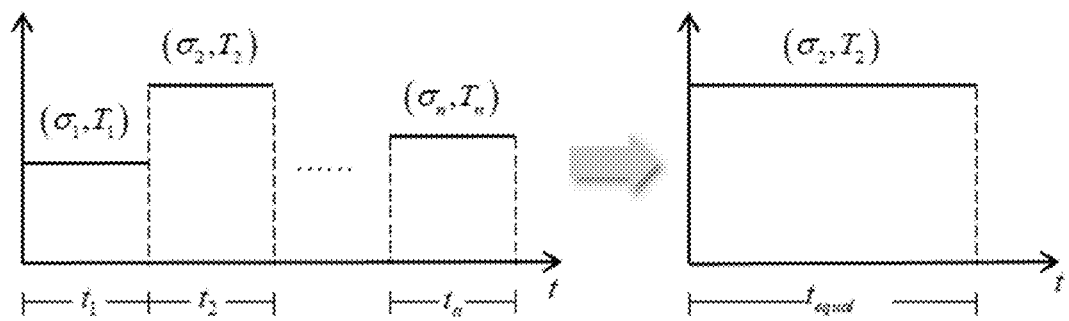
FIG. 2 is an equivalent acceleration spectrum of creep under variable temperatures and loads.
Figure 6:
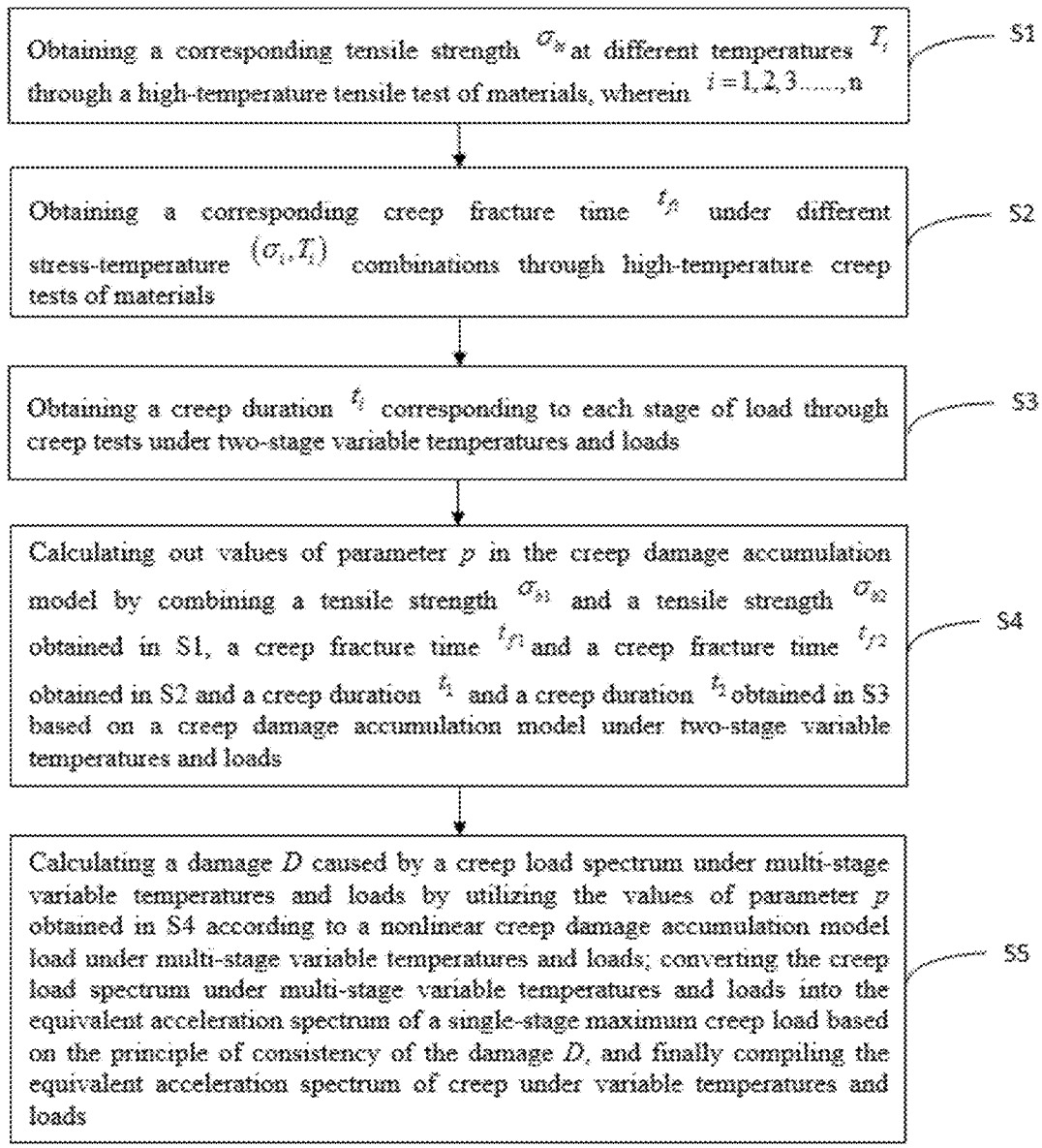
FIG. 6 is the flow chart of a method for compiling an equivalent acceleration spectrum of creep under variable temperatures and loads.

As shown in FIG. 6, a method for compiling an equivalent acceleration spectrum of creep under variable temperatures and loads according to the application includes the following steps:

S1: obtaining a corresponding tensile strength $\sigma_{bi}$ at different temperatures $T_i$ through a high-temperature tensile test of materials, where i=1, 2, 3 . . . , n;

S2: obtaining a corresponding creep fracture time $t_{fi}$ under different stress-temperature ($\sigma_i, T_i$) combinations through high-temperature creep tests of materials;

S3: according to results of high-temperature creep tests, carrying out the creep tests under two-stage variable temperatures and loads on the creep tester until fracture occurs, and recording the creep duration $t_i$ corresponding to each stage of loads;

S4: based on a creep damage accumulation model $$\left(\frac{t_1}{t_{f1}}\right)^{\varphi_{1,2}} + \frac{t_2}{t_{f2}} = 1$$

under two-stage variable temperatures and loads, wherein $$\varphi_{1,2} = \ln\left(\frac{-\ln(\sigma_2/\sigma_{b2})}{-p}\right) \Big/ \ln\left(\frac{-\ln(\sigma_1/\sigma_{b1})}{-p}\right),$$

the tensile strength $\sigma_{b1}$ and the tensile strength $\sigma_{b2}$ obtained in S1, the creep fracture time $t_{f1}$ and the creep fracture time $t_{f2}$ obtained in S2, the creep duration $t_1$ and the creep duration $t_2$ obtained in S3, and a stress $\sigma_1$ and a stress $\sigma_2$ applied in creep tests under two-stage variable temperatures and loads, substituting $\sigma_{b1}$, $\sigma_{b2}$, $t_{f1}$, $t_{f2}$, $\sigma_1$ and $\sigma_2$ into the creep damage accumulation model under two-stage variable temperatures and variable loads, so as to obtain the values of the parameter p in the exponential term; in order to reduce the error because of material data dispersion, a certain number of creep tests under two-stage variable temperatures and loads (for example, three groups of creep tests under two-stage variable temperatures and loads) can be carried out, and then different values of p can be obtained, and finally an average value of p is taken as a final value; and S5: based on the nonlinear damage accumulation model $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}}$$

under multi-stage variable temperatures and variable creep loads, among them, $$\varphi_{n-1,n} = \ln\left(\frac{-\ln(\sigma_n/\sigma_{bn})}{-p}\right) \Big/ \ln\left(\frac{-\ln(\sigma_{n-1}/\sigma_{bn-1})}{-p}\right),$$

with the help of values of p obtained in S4, substituting the values of p into the nonlinear damage accumulation model of creep load under multi-stage variable temperature and variable load to calculate the damage D caused by creep load spectrum under multi-stage variable temperatures and variable loads, as shown in FIG. 1; assuming that a state with maximum creep load in the multi-stage variable temperature and variable load creep load spectrum is ($\sigma_2, T_2$), according to the principle of damage D equivalence, that is, $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}} = \frac{t_{equal}}{t_{f2}},$$

equivalently accelerating other states with smaller creep load to the state ($\sigma_2, T_2$) with maximum creep load, with a result that a duration of original creep load spectrum under multi-stage variable temperatures and variable loads can be accelerated to $t_{equal}$ of the equivalent acceleration spectrum of creep from $t_1+t_2+\ldots+t_n$, thus compiling the equivalent acceleration spectrum of creep under variable temperatures and loads as shown in FIG. 2.

Figure 3:
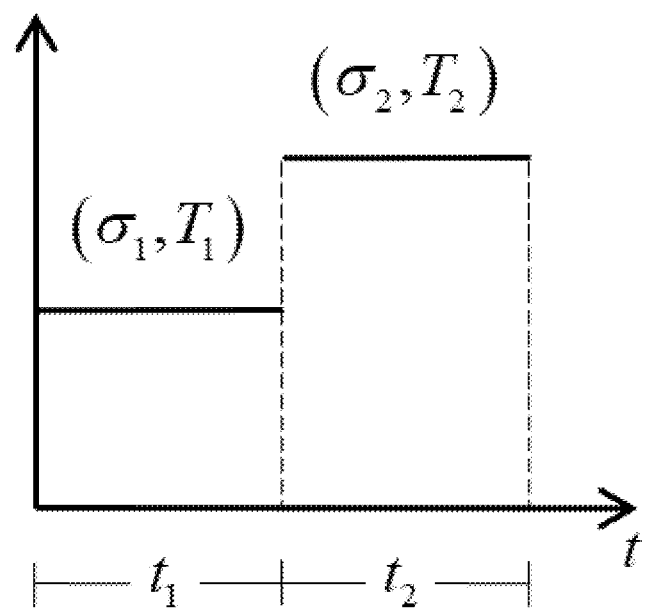
FIG. 3 is a creep load spectrum under two-stage variable temperatures and loads.

Among them, the high-temperature tensile test of materials is carried out on the electro-hydraulic servo fatigue tester, and the high-temperature creep tests of materials and the creep test with two-stage variable temperatures and loads are carried out on the creep tester. Creep tests with two-stage variable temperatures and loads are carried out by manual or a computer to change stresses and temperatures. The purpose of the high-temperature tensile test of materials is to obtain the tensile strength $\sigma_{bi}$ of the material at temperature $T_i$. The high-temperature creep tests of materials are carried out under a series of different stress-temperature ($\sigma_i$,$T_i$) combinations until the materials are subjected to creep fracture, and the corresponding creep fracture time $t_{fi}$ under different stress-temperature ($\sigma_i$,$T_i$) conditions is obtained. The creep test of materials under variable temperature and variable load is carried out on the creep tester, and a certain number of creep tests under variable temperatures and variable loads under two-stage stress-temperature combination are carried out, and the creep duration of each stage of temperature-stress ($\sigma_i$,$T_i$) combination is $t_i$ until the material is subjected to creep fracture. The applied creep load spectrum of two-stage variable temperatures and loads is shown in FIG. 3.

The following will be further explained with an embodiment.

In this embodiment, the method for compiling equivalent acceleration spectrum of creep under variable temperatures and loads proposed by the application is applied to compiling equivalent acceleration spectrum of X8CrNiMoNb-16-16 creep which includes the following steps:

(1) carrying out the tensile test of X8CrNiMoNb-16-16 at 700° C. to obtain the tensile strength $\sigma_b$=313 MPa at 700° C.;

(2) carrying out the high-temperature creep tests under stress of $\sigma_1$=150 MPa and $\sigma_2$=170 MPa respectively at 700° C., and obtaining the corresponding creep fracture time, which are recorded as $t_{f1}$=447 h and $t_{f2}$=200 h;

(3) carrying out a certain number of creep tests under two-stage variable loads at 700° C.; firstly, creeping for $t_1$ under $\sigma_1$, then creeping for $t_2$ under $\sigma_2$ until creep fracture occurs; carrying out several groups of creep tests under variable load with different $t_1$ values, recording the corresponding $t_2$ values respectively and showing the test data in Table 1;

TABLE 1

Creep test data of X8CrNiMoNb-16-16 under two-stage variable load at 700° C.

| Material | Test number | $t_1/t_{f1}$ under single-stage stress $\sigma_1$ | $t_2/t_{f2}$ under single-stage stress $\sigma_2$ |
|---|---|---|---|
| X8CrNiMoNb-16-16 | 1 | 0.05 | 0.7 |
| | 2 | 0.1 | 0.61 |
| | 3 | 0.35 | 0.21 |
| | 4 | 0.40 | 0.25 |
| | 5 | 0.44 | 0.20 |
| | 6 | 0.46 | 0.21 |
| | 7 | 0.55 | 0.21 |
| | 8 | 0.88 | 0.05 |

Figure 4:
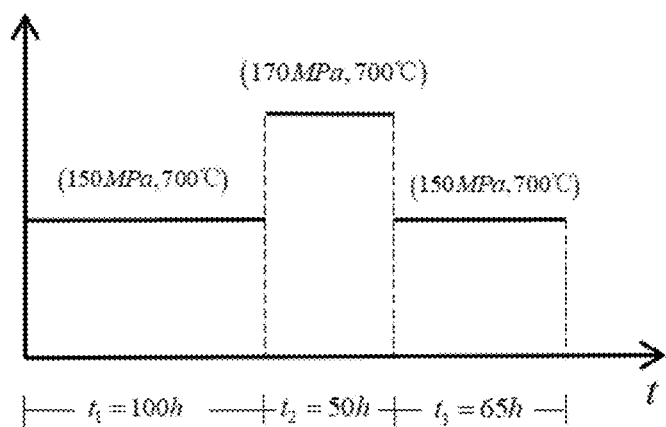
FIG. 4 is a creep load spectrum under three-stage variable temperatures and loads.
Figure 5:
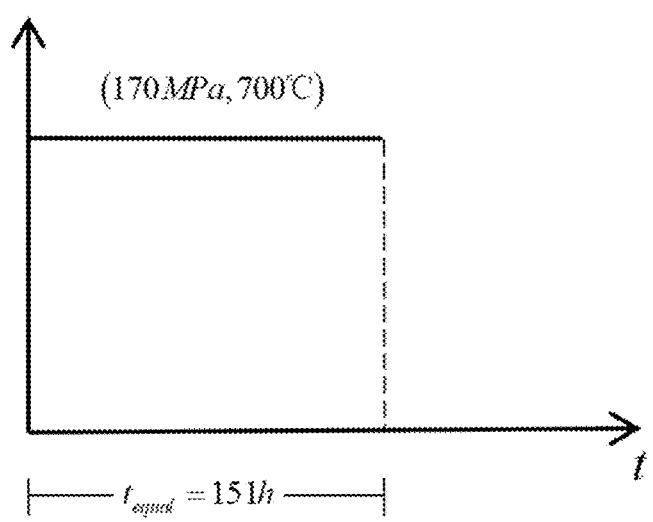
FIG. 5 is a compiled equivalent acceleration spectrum of creep under variable temperatures and loads.

(4) based on the tensile strength $\sigma_b$=313 MPa obtained in S1, $t_{f1}$=447 h and $t_{f2}$=200 h in S2, creep test data under two-stage variable load obtained in S3, and the creep damage accumulation model $$\left(\frac{t_1}{t_{f1}}\right)^{\varphi_{1,2}} + \frac{t_2}{t_{f2}} = 1$$

under two-stage variable temperature and variable load, wherein $$\varphi_{1,2} = \ln\left(\frac{-\ln(\sigma_2/\sigma_{b2})}{-p}\right)\bigg/\ln\left(\frac{-\ln(\sigma_1/\sigma_{b1})}{-p}\right),$$

calculating a series of values of p, which are −0.5385, −0.5365, −0.5783, −0.5605, −0.5694, −0.5627, −0.5406 and −0.5387, respectively and obtaining a final value p=0.5532 by averaging;

(5) substitute p=0.5532 into the nonlinear damage accumulation model of creep load under multi-stage variable temperatures and loads, and getting a nonlinear damage accumulation model of X8CrNiMoNb-16-16 creep as follows:

$$D = \left(\left(\left(\left(\frac{t_1}{t_{f1}}\right)^{\varphi_{1,2}} + \frac{t_2}{t_{f2}}\right)^{\varphi_{2,3}} - \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}};$$

among them, $$\varphi_{n-1,n} = \ln\left(\frac{-\ln(\sigma_n/\sigma_{bn})}{-0.5532}\right)\bigg/\ln\left(\frac{-\ln(\sigma_{n-1}/\sigma_{bn-1})}{-0.5532}\right);$$

with this model, obtaining the value of damage D=0.757 caused by creep load spectrum shown in FIG. 4 under three-stage variable temperature and variable load through calculation; based on the principle of damage equivalence, equivalently converting the creep load spectrum under three-stage variable temperature and variable load to the state (170 MPa, 700° C.) with maximum creep load, that is, $$D = \frac{t_{equal}}{t_{f2}} = 0.757$$

and getting $t_{equal}$=151 h. The compiled equivalent acceleration spectrum of creep under variable temperatures and loads is shown in FIG. 5. It can be seen that under the condition of consistent damage, the equivalent acceleration spectrum of creep shortens the test duration from 215 hours to 151 hours, shortening 64 hours, and the loading duration of the acceleration spectrum is only 70% of the original one.

The above is only the preferred embodiment of the present application. It should be pointed out that for ordinary technicians in the technical field, without departing from the principle of the present application, several improvements and embellishments could be made, which should also be regarded as the protection scope of the present application.

The invention claimed is:

1. A method for compiling an equivalent acceleration spectrum of creep under variable temperatures and loads, comprising:

S1: obtaining a corresponding tensile strength $\sigma_{bi}$ at different temperatures $T_i$ through a high-temperature tensile test of materials, wherein i=1, 2, 3 . . . , n;

S2: obtaining a corresponding creep fracture time $t_{fi}$ under different stress-temperature $(\sigma_i, T_i)$ combinations through high-temperature creep tests of materials;

S3: obtaining a creep duration $t_i$ corresponding to each stage of load through creep tests under two-stage variable temperatures and loads;

S4: calculating values of parameter p in the creep damage accumulation model by combining a tensile strength $\sigma_{b1}$ and a tensile strength $\sigma_{b2}$ obtained in S1, a creep fracture time $t_{f1}$ and a creep fracture time $t_{f2}$ obtained in S2 and a creep duration $t_1$ and a creep duration $t_2$ obtained in S3 based on a creep damage accumulation model under two-stage variable temperatures and loads;

wherein the creep damage accumulation model under two-stage variable temperatures and loads is $$\left(\frac{t_1}{t_{f1}}\right)^{\varphi_{1,2}} + \frac{t_2}{t_{f2}} = 1,$$

wherein, $$\varphi_{1,2} = \ln\left(\frac{-\ln(\sigma_2/\sigma_{b2})}{-p}\right) / \ln\left(\frac{-\ln(\sigma_1/\sigma_{b1})}{-p}\right);$$

and

S5: calculating a damage D caused by a creep load spectrum under multi-stage variable temperatures and loads by utilizing the values of parameter p obtained in S4 according to a nonlinear creep damage accumulation model load under multi-stage variable temperatures and loads; converting the creep load spectrum under multi-stage variable temperatures and loads into the equivalent acceleration spectrum of a single-stage maximum creep load based on the principle of consistency of the damage D, and finally compiling the equivalent acceleration spectrum of creep under variable temperatures and loads;

wherein the nonlinear creep damage accumulation model load under multi-stage variable temperatures and loads is $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}},$$

wherein, $$\varphi_{n-1,n} = \ln\left(\frac{-\ln(\sigma_n/\sigma_{bn})}{-p}\right) / \ln\left(\frac{-\ln(\sigma_{n-1}/\sigma_{bn-1})}{-p}\right);$$

assuming a state with maximum creep load in the creep load spectrum under multi-stage variable temperatures and loads to be $(\sigma_2, T_2)$, then according to the principle of the damage D equivalence represented by $$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}} = \frac{t_{equal}}{t_{f2}},$$

other states with smaller creep loads are equivalently accelerated to the state $(\sigma_2, T_2)$ with maximum creep load, and a duration of the creep load spectrum of original multi-stage variable temperatures and loads could be accelerated to $t_{equal}$ of the equivalent acceleration spectrum of creep from $t_1 + t_2 + \ldots + t_n$, so as to compile the equivalent acceleration spectrum of creep under variable temperatures and loads.

2. The method according to claim 1, wherein in S1, the high-temperature tensile test of materials is carried out on an electro-hydraulic servo fatigue tester.

3. The method according to claim 1, wherein in S2, the high-temperature creep tests of materials are carried out on a creep tester, and a series of high-temperature creep tests of materials under different stress-temperature $(\sigma_i, T_i)$ combinations are carried out.

4. The method according to claim 1, wherein in S3, according to results of the high-temperature creep tests, the creep tests under two-stage variable temperatures and loads are carried out on a creep tester until fracture occurs, and the creep duration $t_i$ corresponding to each stage of load is recorded.

5. The method according to claim 4, wherein in S3, the creep tests under two-stage variable temperatures and loads are carried out manually or by a computer to change a stress and a temperature.

6. The method according to claim 1, wherein in S4, p is an average value of results obtained from multiple tests.

* * * * *